(12) United States Patent
Kulkarni

(10) Patent No.: US 7,346,660 B2
(45) Date of Patent: Mar. 18, 2008

(54) METHOD AND SYSTEM FOR MANAGING AND RETRIEVING DATA

(75) Inventor: Suhas Sudhakar Kulkarni, Maharashtra (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 700 days.

(21) Appl. No.: 10/372,576

(22) Filed: Feb. 21, 2003

(65) Prior Publication Data

US 2004/0167963 A1 Aug. 26, 2004

(51) Int. Cl.
*G06F 15/16* (2006.01)
*G06F 17/00* (2006.01)

(52) U.S. Cl. .................. 709/206; 709/207; 707/100

(58) Field of Classification Search ............. 709/206, 709/207, 227; 719/313; 707/10, 100
See application file for complete search history.

(56) References Cited

U.S. PATENT DOCUMENTS

| | | | | |
|---|---|---|---|---|
| 5,281,962 A * | 1/1994 | Vanden Heuvel et al. | . | 340/7.52 |
| 5,487,100 A * | 1/1996 | Kane | ................ | 340/7.23 |
| 5,822,527 A * | 10/1998 | Post | ................ | 709/206 |
| 5,923,848 A * | 7/1999 | Goodhand et al. | ........ | 709/219 |
| 5,948,058 A * | 9/1999 | Kudoh et al. | ............ | 709/206 |
| 6,081,829 A * | 6/2000 | Sidana | ................ | 709/203 |
| 6,779,178 B1 * | 8/2004 | Lloyd et al. | ............ | 717/174 |
| 2002/0078158 A1 * | 6/2002 | Brown et al. | ............ | 709/206 |
| 2002/0091772 A1 * | 7/2002 | Yong | .............. | 709/206 |
| 2003/0120737 A1 * | 6/2003 | Lytle et al. | ............ | 709/206 |
| 2003/0154254 A1 * | 8/2003 | Awasthi | .............. | 709/206 |
| 2003/0177190 A1 * | 9/2003 | Moody et al. | .......... | 709/206 |
| 2004/0010513 A1 * | 1/2004 | Scherr et al. | .......... | 707/104.1 |
| 2004/0054744 A1 * | 3/2004 | Karamchedu et al. | ...... | 709/206 |
| 2004/0059786 A1 * | 3/2004 | Caughey | .............. | 709/206 |
| 2004/0128355 A1 * | 7/2004 | Chao et al. | ............ | 709/206 |
| 2004/0167963 A1 * | 8/2004 | Kulkarni | .............. | 709/206 |

OTHER PUBLICATIONS

Tanenbaum, Andrew S. "Computer Networks," Third Edition, Prentice Hall PTR, 1996; pp. 695-706.*
Tanenbaum, Andrew S. "Computer Networks," Third Edition, Prentice Hall PTR, 1996; pp. 681-695.*

* cited by examiner

*Primary Examiner*—Zarni Maung

(57) ABSTRACT

A method and a system for managing and retrieving data within an electronic mail editor and/or an application external of the electronic mail editor are provided. In conventional systems, a user needs to sieve through their e-mail messages to locate messages of a same subject and thereafter to identify a most current or his required information. In the present invention, a reference data tag is inserted in an e-mail message and is linked to tag values stored in an appropriate database. The data tag may have one or more instances inserted in other messages at different times and assigned a different data tag value at the time of insertion. The data tag may be represented by similar indicia. To retrieve a most current value among the different values, a user merely accesses any of the indicia in any of the messages.

12 Claims, 7 Drawing Sheets

CREATE NEW DATA TAG

ENTER DATA TAG NAME  [                    ]

ENTER DATA TAG VALUE [                    ]

STORE IN:  ○ PERSONAL DATABASE

○ ORGANIZATION LOCAL DATABASE

● ORGANIZATION GLOBAL DATABASE

[ INSERT ]

Figure 2A

Sent: Fri 9/27/2002 9.00 a.m.

From: glenn@inhost.com

To: e-wallet_team@inhost.com

Cc:

Subject: E-Wallet Project

Hello,

Please note that the updated version is v2.1  404

E-wallet version and the next system integration meeting is on 1 Oct 2002 at 2p.m.  402

E-wallet meeting

SEARCH DATA TAG

602

ENTER TAG NAME TO SEARCH

DATE OF TAG MODIFICATION

DATE OF TAG CREATION

TAG CREATED BY

STORE IN:  ○ PERSONAL DATABASE

○ ORGANIZATION LOCAL DATABASE

● ORGANIZATION GLOBAL DATABASE

SEARCH

Figure 6

METHOD AND SYSTEM FOR MANAGING AND RETRIEVING DATA

BACKGROUND OF THE INVENTION

1. Field of the Invention.

The present invention relates to data retrieval systems. More particularly, it relates to a method and a system for managing and retrieving data within an electronic mail editor and/or an application external of the electronic mail editor.

2. Description of Background Information.

Business information is increasingly communicated by means of electronic mail (hereinafter "e-mail"). This communication of information may relate to business critical issues and may span over numerous e-mail messages over a time period. Generally, e-mail users retain most messages because the messages contain developments, updates, attachment files and history of responses pertaining to a subject.

Often, an e-mail user would still refer to less recent messages on a same subject to locate specific information, or to follow developments on the subject, or to forward a most current information to another user. Such information may include timelines, meeting details, particulars of customers and change requests on software release. To locate certain information on a subject, a user may sort messages according to subject heading or sender. Thereafter, he identifies relevant messages and accesses the messages separately. Since e-mail messages usually comprise of free-form text, the user may have to read the message contents of several messages in detail before locating the information he requires. Further, since contents of e-mail messages are static, contents of less recent messages may reflect outdated information. Hence, the user may need to compare information between two or more messages to identify the most up-to-date information.

In existing e-mail editors, a user generally locates information using the above-described method. Although most users have accustomed to using this method, it is tedious to repeat this time-consuming procedure each time a user wishes to locate a piece of information. Furthermore, a user may, due to oversight or urgency of time, incorrectly identify the required or most current information. Accordingly, a method and a system for managing and retrieving information are needed.

SUMMARY OF THE INVENTION

The present invention provides a method of managing and retrieving data within an electronic mail editor and/or an application external of the electronic mail editor.

A user first inserts a reference data tag (hereinafter "data tag") in a message body section when he is composing a message. The user also assigns a current value to the data tag and selects a database to store the data tag and its value (hereinafter "tag-value pair). The data tag may be reassigned new values when necessary. The data tag may be displayed as an indicium in the message. The data tag may have one or more instances inserted in other messages at different times. The other instances may be represented by similar indicia and assigned different data tag values at the time of insertion. A recipient user or a group of recipient users may access the indicium in any of the messages containing the data tag for retrieving a most current value among the different values.

According to another aspect of the invention, the user may also retrieve two or more data tag values which have been assigned to the data tag over a period of time.

BRIEF DESCRIPTION OF THE DRAWINGS

The present invention will be described with reference to drawings, in which:

FIG. 2A illustrates a pop-up window for creating a new data tag.

FIG. 6 illustrates a pop-up window for retrieving information on a data tag.

DETAILED DESCRIPTION

The present invention provides a method and system for managing and retrieving information within an e-mail editor and/or an application external of the e-mail editor. It allows a user fast access to most current information on a subject without requiring him to read the entire contents of one or more messages before locating the required information. In order to do this, a sender of a message first inserts a reference data tag in a message when he is composing the message. He then assigns a current value to the data tag and may also select an appropriate database for storing the data tag-value pair. The data tag may be embedded in the body section of a message and displayed as an indicium. The data tag may be later assigned other more current values. The indicium may be accessed to retrieve a most current value of the data tag from the appropriate database. Hence, even if a user is reading a less recent message, he is able to retrieve up-to-date information quickly. The present invention also allows the user to retrieve a history of tag values should he require such information. Thus, with the invention, it is now not necessarily for the user to locate a most recent message on a subject or read several messages in order to locate up-to-date information on the subject. The insertion and update of data tags, and the retrieval of data tag values from the databases are enabled by making Application Program Interface (API) calls.

Figure 1:
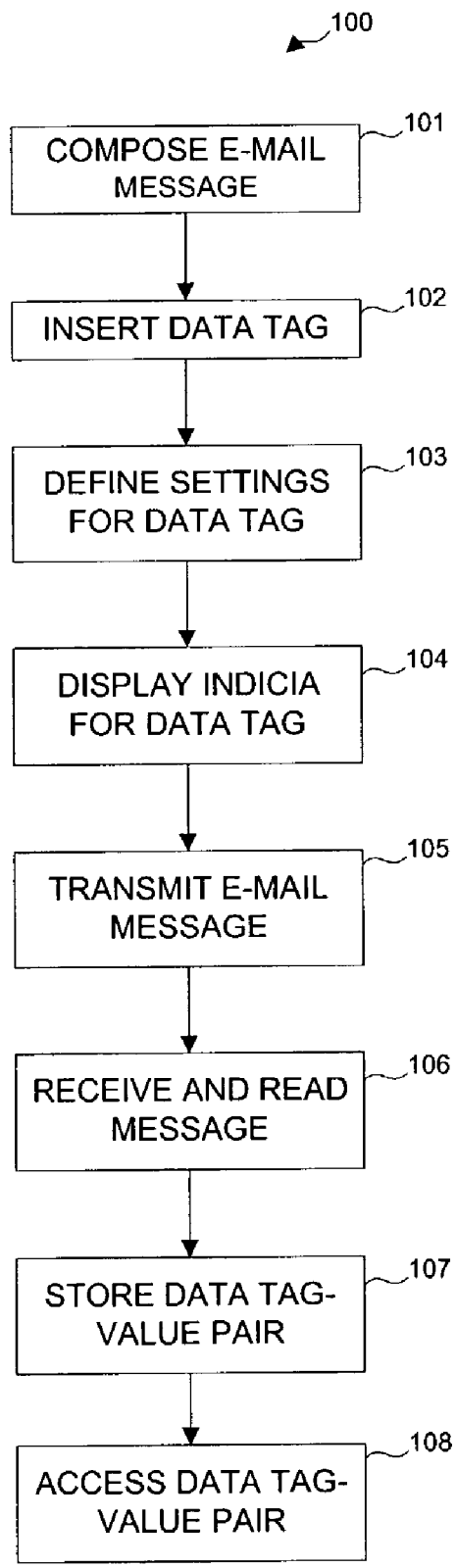
FIG. 1 is a flow sequence describing the operation of the present invention.

Reference is now made to a flow sequence 100 in FIG. 1, which describes the operation of the present invention.

The flow sequence 100 starts in a COMPOSE E-MAIL MESSAGE step 101, where a sender composes a new message in an e-mail editor, such as Microsoft Outlook. In a manner known in the art, the sender also specifies the addresses of recipients and prepares a message body typically containing free form text, i.e., text sequences organized into paragraphs.

Figure 2B:
FIG. 2B illustrates a pop-up window for inserting an existing data tag.

According to the present invention, the user may insert a data tag at any desired position within the message body section in an INSERT DATA TAG step 102. The user can insert a data tag using one of several ways, for example, by selecting a menu option from a pull-down menu or by right-clicking on a cursor positioning device for displaying menu options for the user's selection. Thereafter, the user may be prompted to define settings for the data tag in a DEFINE SETTINGS FOR DATA TAG step 103. The user may create a new data tag and assign it a value, or insert an existing data tag and modify its value, or insert an existing data tag without modifying its value. According to whether the user chooses to insert an existing data tag or a new data tag, the user may be presented with an appropriate window, such as those illustrated in FIGS. 2A and 2B. FIG. 2A shows a pop-up window for creating new data tags, where the user specifies a new data tag name, assigns a tag value and selects a database for storing the new data tag. FIG. 2B shows a pop-up window for selecting a data tag from existing data tags. It may also allow a user to modify the tag value of a selected data tag. When a data tag value has been modified, an API call is made to store the newly modified data tag-value pair in the appropriate database.

Figure 3:
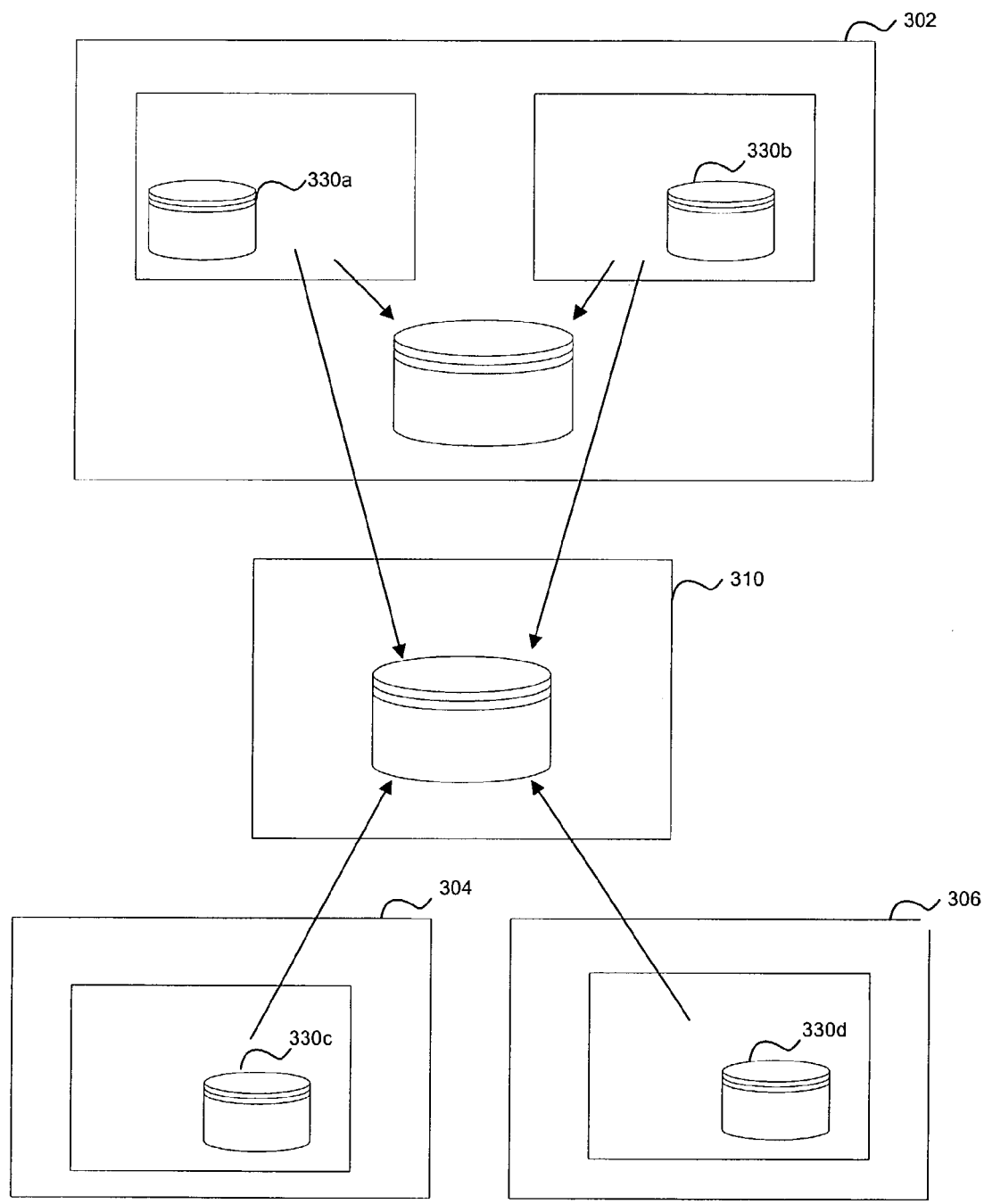
FIG. 3 illustrates typical relationships among personal, local and global databases.

In the present invention, the database is generally one of personal database, local organization database and global organization database. The relationships among these databases are illustrated in FIG. 3. A personal database 330*a*, 330*b*, 330*c*, 330*d* generally refers to a database that is accessible only by a user, though it may sometimes be accessed or shared with a few other users who have been granted such permissions. Local organization database 302 generally refers to a shared database that enables a small group of users typically in a same geography, to access it. Global organization database 310 generally refers to shared database that is accessible by a larger group of users typically from different geographies 302, 304, 306, for example, employees of a multinational corporation.

Figure 4:
FIG. 4 illustrates an e-mail message containing data tags
Figure 4:

After the DEFINE SETTINGS FOR DATA TAG step 103, the data tag is inserted in the message and displayed as an indicium in a DISPLAY INDICIUM FOR DATA TAG step 104. The indicium is typically arranged at the cursor position where the user had initiated the insertion of the data tag, as shown in FIG. 4. The indicium may be in the form of an icon or highlighted text or the like. The current value of the data tag may also be retrieved from the database and displayed when a cursor is placed over it. When the sender has composed the message and initiated an action to send the message, the message is transmitted as known in the art in a TRANSMIT E-MAIL MESSAGE step 105 of FIG. 1. The data tag embedded in the message body is represented as Hyper Text Marked-up Language (HTML) tags to indicate that it is a tag-value pair instead of plain text.

At the recipient's end, the message containing the data tag is received and read by the recipient in a RECEIVE AND READ MESSAGE step 106. If the e-mail viewer of the recipient is data tag-value enabled, the data tag and value are displayed as an indicium 402, 404 as illustrated in FIG. 4. The indicium 402, 404 may be accessed to retrieve its respective most current value from the database. If the e-mail viewer of the recipient is not data tag-value enabled, the user-specified value of the data tag is displayed as text which describes the value specified by the sender.

If the sender has stored the data tag in his personal database, or if the sender has stored the data tag in a local organization database to which the recipient is not a member, the data tag is, at this point, not yet stored in any database accessible to the recipient. In order to retrieve the data tag-value pair at a later time, it is necessary for the recipient to store the data tag to his personal database or a local or global organization database in a STORE DATA TAG VALUE PAIR step 107. If the data tag already exists in the selected database, the recipient may also be accorded permission to overwrite existing data tag value. Alternatively, the sender may select a different database for storing the data tag-value pair. However, if the sender has stored the data tag in a local organization or global organization database accessible to the recipient, it is not necessary for the recipient to store it again.

The above-mentioned databases may be implemented in Lightweight Directory Access Protocol (LDAP) or Relational Database Management System (RDBMS) format as known in the art, for accessing the database in the organization network. The databases may contain information on data tag name, a history of data tag values, date of creating each data tag, creator of the data tag, date of last modification of data tag and permission information. The databases may be indexed in any standard indexing mechanism such as Indexed Sequential Access Method (ISAM), binary tree, hash or the like for organizing and retrieving data.

Figure 5:
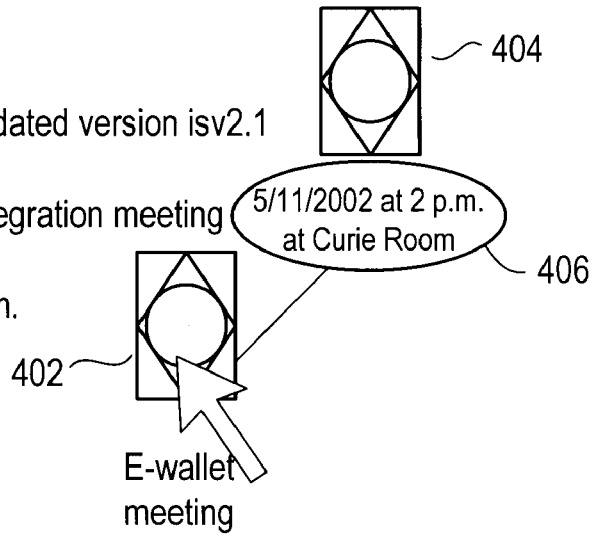
FIG. 5 illustrates an e-mail message containing data tags, where a cursor is positioned over a data tag for displaying a most current tag value.

When a data tag-value pair is created, it is accessible to authorized users of the database in which the data tag-value pair is stored in an ACCESS DATA TAG VALUE PAIR step 108. Preferably, the data tag-value pair is accessed from the e-mail editor, such as, (1) by placing a cursor over an indicium 402, 404 in the message body to retrieve a tag value (see FIG. 5) or (2) by providing a window to select and retrieve a tag value (see FIG. 6) or the like. The retrieval of data tag values are enabled by making API calls to access an appropriate database. The former method allows a user to retrieve a current data tag value while reading a less recent message in a series of messages relating to the subject of the data tag. Referring to FIG. 5, it is noted that the callout box 406 shows a most current value of a data tag "E-wallet meeting" 402 while the message of FIG. 5 is actually a less recent message. In the latter method, a user in the midst of any task unrelated to the subject of a data tag or in an application external of the e-mail editor may easily access a tag value or a most current value by invoking an appropriate window as shown in FIG. 6 to enter his search criteria for retrieving the data tag and its value therefrom. With this menu option, it is not necessary to locate a message relating to the subject matter of a data tag and opening the message to access the indicium for retrieving the tag value. It is also not necessary to access a most recent message on a subject to retrieve a most current value of a data tag associated with the subject."

The data tags may have several other instances inserted in other messages, where the data tags have been assigned different values in the messages. These instances may be represented by similar indicia. When each of these indicia is accessed, the most current value of the different values is retrieved from the database where the data tag values are stored. Alternatively, two of more of the different values may be retrieved from the database.

FIG. 6 illustrates a window which allows a user to search for data tag-value pair by entering an appropriate search criteria in a "Enter tag name to search" field 602 or similar fields. Alternatively, the data tag may be accessed by first selecting an appropriate database and searching among existing data tags for the required tag.

What is claimed is:

1. A method of managing and retrieving data comprising:
    receiving a first user input indicative of a request for creating a first data tag and a first value associated with the first data tag, and the first user input is indicative of a request for inserting the first data tag and the first value in a first message;
    receiving the first data tag and the first value associated with the first data tag;
    storing the first data tag and the first value in a database;

inserting the first data tag within a message body of the first message, the first data tag represented by a first indicium in the message body of the first message;

receiving a second user input indicative of a request for creating a second data tag and a second value associated with the second data tag, and the second user input is indicative of a request for inserting the second data tag and the second value in a second message;

receiving the second data tap and the second value associated with the first data tag;

inserting the second data tag within a message body of the second message, the second data tag represented by a second indicium in the message body of the second message;

storing the second data tag and the second value in the database;

assigning the first value to the first data tag and the second value to the second data tag in the database;

accessing any of the first indicium or the second indicium; and retrieving data from the database in response to the accessing of any of the first indicium or the second indicium, wherein the retrieved data is the first value or the second value, whichever is a most recent value.

2. The method of claim 1 further comprising:
transmitting at least one of the first message and the second message to a plurality of recipients; and
enabling the plurality of recipients to access the database.

3. The method of claim 1 further comprising:
providing an interface within an electronic mail editor or an application external of the electronic mail editor or both for retrieving the most current value.

4. The method of claim 1, wherein assigning the first value to the first data tag and a second value to the second data tag in the database comprises:
storing the first data tag and the first value as a first data tag and first value pair such that the first value is operable to be retrieved from the database in response to accessing the first indicium representing the first data tag; and
storing the second data tag and the second value as a second data tag and second value pair such that the second value is operable to be retrieved from the database in response to accessing the second indicium representing the second data tag.

5. The method of claim 1, further comprising:
receiving a modification to the first value;
storing the modified first value in the database; and
retrieving the modified first value from the database in response to accessing of any of the first indicium or the second indicium and if the modified first value is more recent than the second value.

6. The method of claim 1, further comprising:
selecting the database for storing the first data tag, the first value, the second data tag, and the second value from a plurality of databases based on whether the at least one user and at least one other user receiving the first or second message has access to the database.

7. The method of claim 1, further comprising:
inserting the first value within the message body of the first message, and a tag-value pair comprised of the first data tag and the first value are represented by the first indicium in the message body of the first message.

8. The method of claim 7,
wherein the recipient of the first message stores the tag-value pair in at least one database.

9. The method of claim 1, further comprising:
inserting the second value within the message body of the second message, and a tag-value pair comprised of the first data tag and the first value are represented by the second indicium in the message body of the second message.

10. The method of claim 1, further comprising:
receiving a search for all values associated with the first tag and the second tag stored in the database; and
retrieving the first value and the second value as search results; and
providing the search results to a user.

11. A method of managing e-mail comprising:
receiving a first user input indicative of a request for creating a first data tag and a first value associated with the first data tag, and the first user input is indicative of a request for inserting the first data tag and the first value in a first email;
receiving the first data tag and the fist value associated with the first data tag;
storing the first data tag and the first value in a database;
inserting the first data tag within a e-mail body of the first e-mail, the first data tag represented by a first indicium in the e-mail body of the first e-mail;
receiving a second user input indicative of a request for creating a second data tag and a second value associated with the second data tag, and the second user input is indicative at a request for inserting the second data tag and the second value in a second e-mail;
receiving the second data tag and the second value associated with the first data tag;
inserting the second data tag within a e-mail body of the second e-mail, the second data tag represented by a second indicium in the e-mail body of the second e-mail;
storing the second data tag and the second value in the database;
assigning the first value to the first data tag and the second value to the second data tag in the database;
accessing any of the first indicium or the second indicium in either the first or second e-mail; and
retrieving data from the database in response to the accessing of any of the first indicium or the second indicium, wherein the retrieved data is the first value or the second value, whichever is a most recent value.

12. The method of claim 11, wherein the first and second values are not e-mails or representations of e-mails and are instead values input by the a least one user that are associated with the content of the first or second respective e-mail.

* * * * *

UNITED STATES PATENT AND TRADEMARK OFFICE
CERTIFICATE OF CORRECTION

PATENT NO. : 7,346,660 B2  Page 1 of 1
APPLICATION NO. : 10/372576
DATED : March 18, 2008
INVENTOR(S) : Suhas Sudhakar Kulkarni It is certified that error appears in the above-identified patent and that said Letters Patent is hereby corrected as shown below:

In column 5, line 9, in Claim 1, delete "tap" and insert -- tag --, therefor.

In column 6, line 36, in Claim 11, delete "at" and insert -- of --, therefor.

In column 6, line 56, in Claim 12, delete "a least" and insert -- at least --, therefor.

Signed and Sealed this

Twenty-sixth Day of August, 2008

JON W. DUDAS
*Director of the United States Patent and Trademark Office*